(12) United States Patent
Raabe

(10) Patent No.: US 6,399,180 B1
(45) Date of Patent: Jun. 4, 2002

(54) SUPPORT MATERIAL WITH LOW PIT LEVEL

(75) Inventor: Günter Raabe, Georgsmarienhütte (DE)

(73) Assignee: Felix Schoeller Jr. Foto-und Spezialpapiere GmbH & Co. KG (DE)

( * ) Notice: Subject to any disclaimer, the term of this patent is extended or adjusted under 35 U.S.C. 154(b) by 0 days.

(21) Appl. No.: 09/268,820

(22) Filed: Mar. 16, 1999

(30) Foreign Application Priority Data

Mar. 21, 1998 (DE) .......................... 198 12 445

(51) Int. Cl.[7] .................................. D06N 7/04
(52) U.S. Cl. ................... 428/141; 428/409; 428/500
(58) Field of Search ........................ 428/409, 500, 428/141, 172, 339

(56) References Cited

U.S. PATENT DOCUMENTS

| 3,888,679 | A | * | 6/1975 | Komatsu et al. | 96/87 R |
|---|---|---|---|---|---|
| 4,807,693 | A | * | 2/1989 | Laxmanan et al. | 164/452 |
| 5,004,644 | A | * | 4/1991 | Dethlefs | 428/323 |
| 5,212,005 | A | | 5/1993 | Uehara | 428/141 |
| 5,677,262 | A | * | 10/1997 | Mruk et al. | 503/227 |
| 6,060,139 | A | * | 5/2000 | Peiffer et al. | 428/35.7 |

FOREIGN PATENT DOCUMENTS

| EP | 0737889 | 10/1996 |
|---|---|---|
| JP | 1-166036 | 6/1989 |

* cited by examiner

*Primary Examiner*—Bruce H. Hess
*Assistant Examiner*—B. Shewareged
(74) *Attorney, Agent, or Firm*—Cook, Alex, McFarron, Manzo, Cummings & Mehler, Ltd.

(57) ABSTRACT

A polyolefin-coated support material is characterized by a high gloss and a low pit level with a high production rate due to its production with a chill roll having an electrolytically structured surface with a standard deviation of the roughness Rz of 0.050 $\mu$m to 0.120 $\mu$m.

6 Claims, 4 Drawing Sheets

Figure 3A:
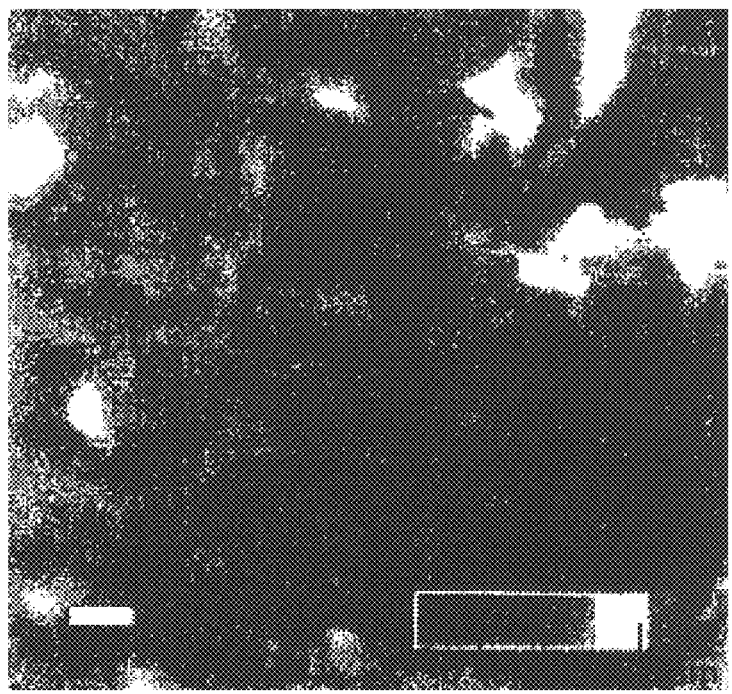

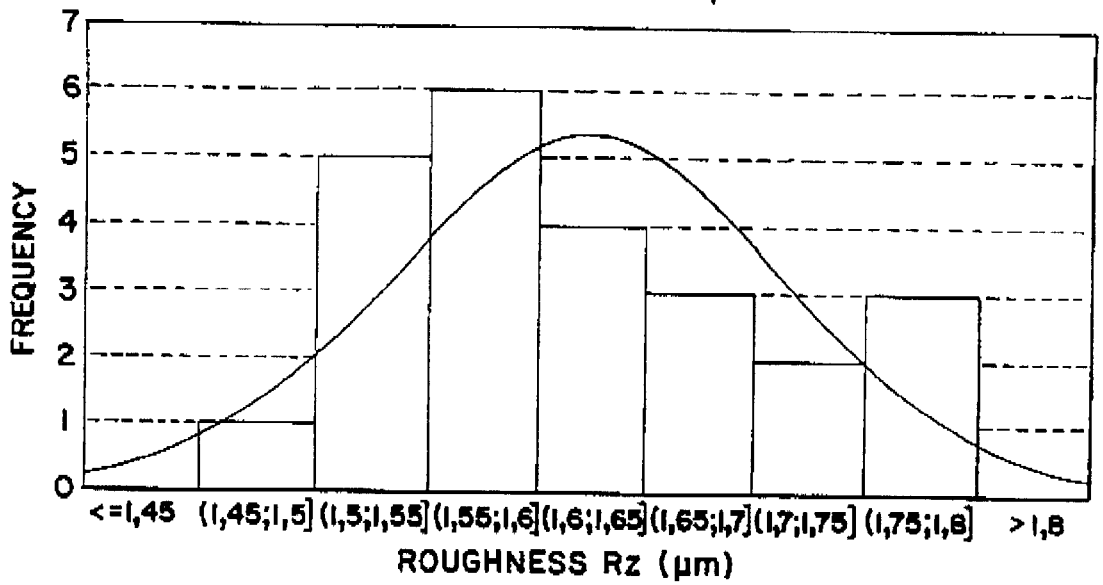
Figure 1: HISTOGRAM OF THE ROUGHNESS DISTRIBUTION OF THE CHILL ROLL SURFACE WITH AN ELECTROLYTICALLY PRODUCED STUCTURE
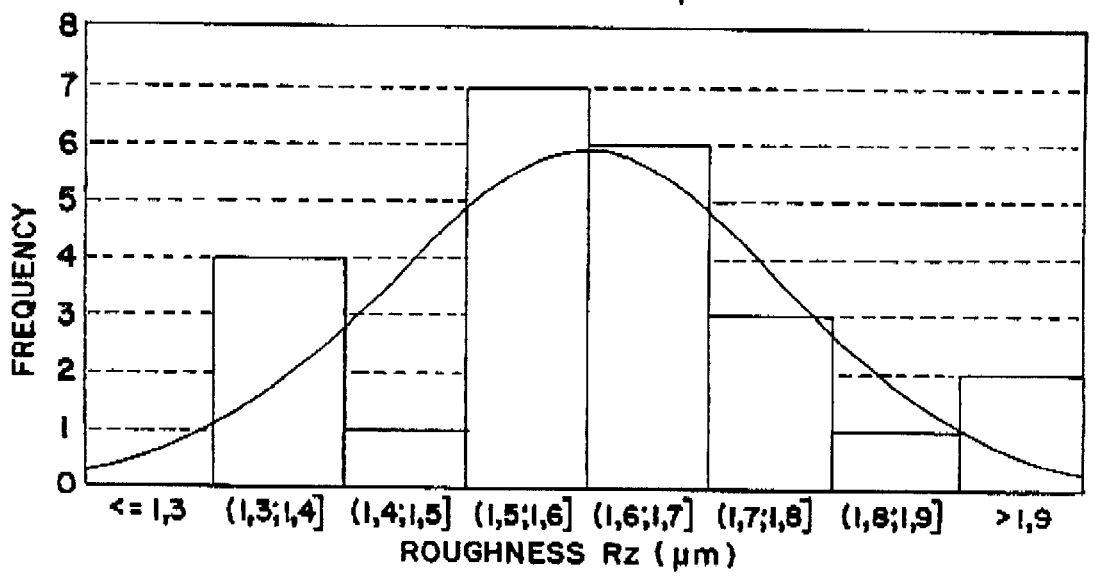
Figure 2: HISTOGRAM OF THE ROUGHNESS DISTRIBUTION OF THE CHILL ROLL SURFACE WITH A STRUCTURE PRODUCED BY SANDBLASTING Surface analysis of specimen 1

Surface analysis of specimen 2

SCANNING ELECTRON MICROGRAPHS (Lighting angle 45°)

SUPPORT MATERIAL WITH LOW PIT LEVEL

BACKGROUND, SUMMARY AND DESCRIPTION OF THE INVENTION

This invention concerns a resin-coated paper, in particular a support material for photographic and non-photographic imaging methods. In addition, it concerns a method of producing said support material.

In finishing papers by bonding the surface area to at least one resin layer in an extrusion or coextrusion process, the appearance and properties of the base material should be improved. This is true in particular of the increase in stiffness, tensile strength, thermal stability and insensitivity to liquids or gases. Glossy or structured surfaces can be produced by using special rollers.

The extrusion material, which is in the form of granules, grains or powder is compacted, melted and homogenized in the extruder. The molten extrusion material is applied to the substrate by means of an extrusion die, which is adapted to the width of the paper web. The paper is pretreated to achieve good bonding strength. Flame pretreatment, corona treatment, an ozone shower or primer application is used to improve adhesion. The extruded film is cooled by means of a chill roll. The surface of this chill roll also has a significant influence on the surface of the composite material.

Extrusion coating of paper, and in particular papers for photographic and non-photographic imaging processes, is performed for various reasons. The film extruded onto the paper prevents absorption of liquids, and with photographic paper it prevents uptake of the developer solutions, thereby guaranteeing rapid and environmentally friendly processing, because developer that has penetrated need not be washed out in a time-consuming process. The structure of the surface can be adapted to the desired requirements from "high gloss" to "highly structured" in a controlled manner. The structured surface of the material laminate is a mirror image of the surface of the chill roll. Chill rolls used previously in extrusion of paper are produced by chrome plating the chill roll body and then sandblasting. This forms a multitude of recesses, usually very fine, on the surface of the chill roll. Depending on the type and size of the sandblasting material and the duration of the treatment, surfaces from "high gloss" to "very matte" can be produced.

In extrusion coating of the paper, crater-like surface defects, so-called pits, are formed on the polymer surface in accordance with the extrusion rate. Due to the high rotational speed of the chill roll, air bubbles which have settled in the above-mentioned recesses in the surface of the chill roll cannot escape or be removed before the chill roll comes in contact with the hot extrusion material. The resulting pits have a negative effect on the gloss and the visual appearance. With an increase in extrusion rate, the number of pits in the resulting coating also increases. These problems are described in EP 285 146 A2.

Japanese patent application JP 7261325 describes a polyolefin-coated photographic support material with a precisely defined surface roughness to prevent pits at a production rate of at least 150 m/min. This photographic support material is characterized by a high gloss and low pit level. One disadvantage of this method is the narrow roughness range of the product. Furthermore, the production rate can be increased only to a limited extent.

EP 285 146 A2 describes a method of preventing pits or craters, by replacing the air bubbles in the depressions of the chill roll with a gas which can escape more easily through the extruded film. Here again, however, the low production rate and the great technical complexity are disadvantages.

In U.S. Pat. No. 4,994,357, pits are prevented by increasing the pressure of the polyolefin-coated paper on the chill roll. Further improvements are said to be achieved by using an especially smooth base paper and a multilayer coating of the surface with polyolefin. However, only a low production rate is possible due to the high contact pressure, because the polyolefin can separate from the chill roll at high speeds.

In addition to the photographic support material, the field of non-photographic imaging methods such as ink jet methods or thermal transfer methods must also rely on a uniform support material. In order to obtain photographic quality printings as much as possible in these methods, resin-coated papers are being used to an increasing extent. Disturbances such as pits are very apparent as spots in the gloss due to the lower application of plastic in the pit areas.

The object of the invention is to provide a resin-coated support material which is characterized by uniform surface properties and a low pit level. In addition, another object of this invention is to increase production rate while maintaining a low pit level.

These objects are achieved by a polyolefin-coated support material with a surface that is shaped with a chill roll whose surface has an electrolytically produced structure.

In producing the support material according to this invention, rolls are used which are not sandblasted for the surface treatment after being plated with chrome. By reversing the direction of the electric current in a controlled manner during electroplating, surface structures can be created in a controlled manner. These are uniformly distributed rounded elevations. Therefore, this type of chill roll differs from the previous types of chill rolls where the surface is formed by removal of material in that it is a mirror image. The chill rolls for the support materials according to this invention have a uniform roughness distribution Rz in comparison with traditional chill rolls, as shown by the standard deviations in FIGS. 1 and 2. The standard deviations for these chill rolls are in the range between 0.050 μm and 0.120 μm, preferably 0.060 μm to 0.100 μm. This yields a surface with a uniform gloss in extrusion. Areas with different gloss values on the surface of the support material, as with traditional chill rolls, no longer occur according to this invention. The roughness Rz of the chill roll depends on the desired gloss values of the support material, amounting to 0.800 μm to 1.900 μm, in particular 1.000 μm to 1.700 μm.

Figure 3B:
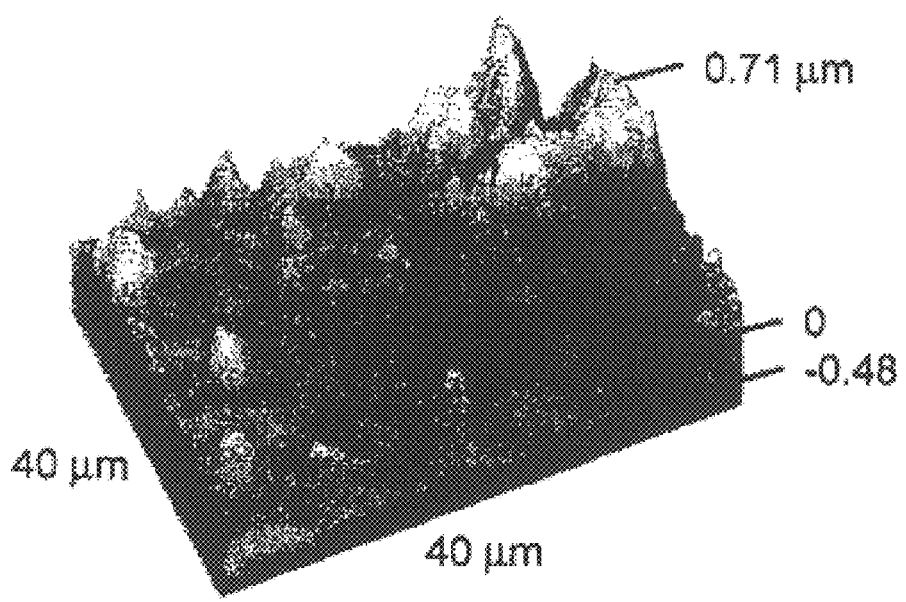
Figure 3C:
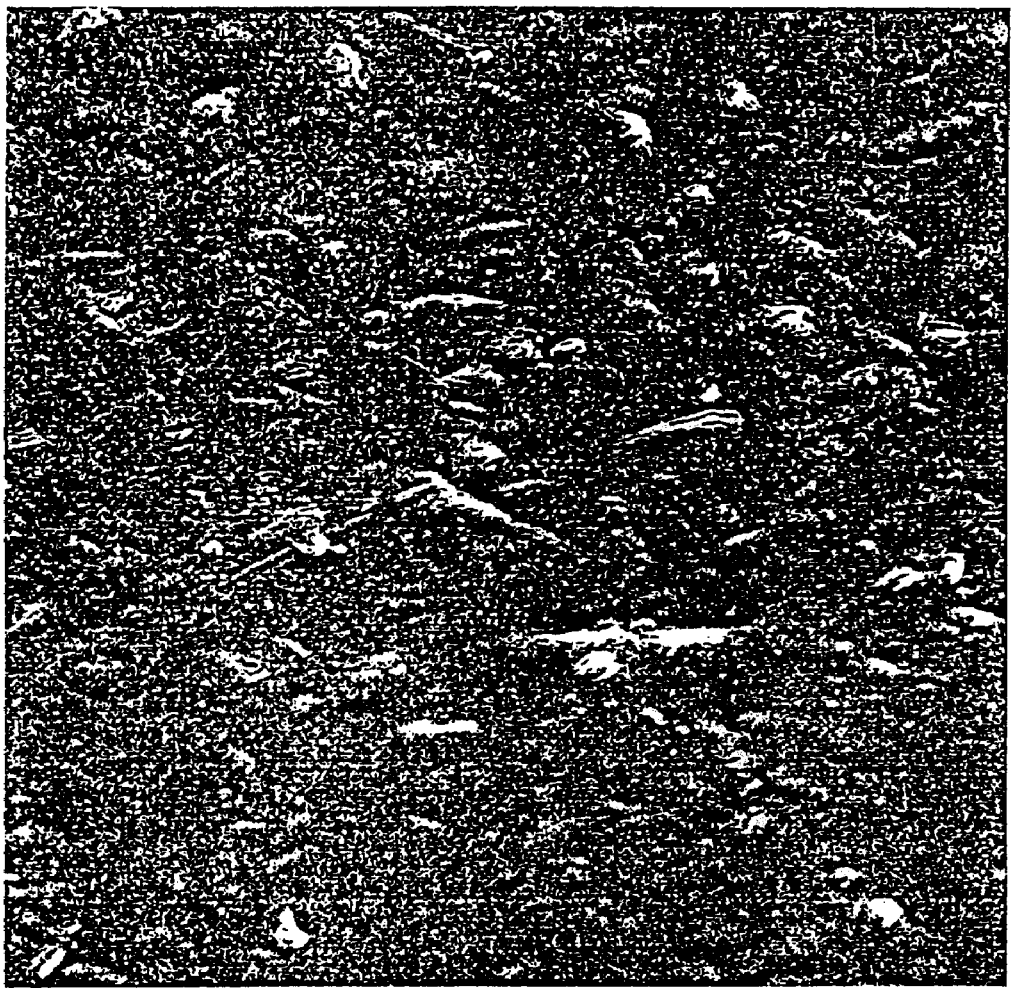

FIG. 3 with subfigures 3a and 3b shows a paper surface (according to Comparative Example 1) produced with a traditional sandblasted roll. These photographs were made with a confocal laser microscope. FIG. 3b shows a three-dimensional diagram of the paper surface. The large number of pits in the paper surface is noteworthy. This causes an increase in the number of air inclusions with an increase in extrusion rate and thus an increase in the number of pits. FIG. 3a shows a view of the three-dimensional diagram corresponding to the laser micrograph in FIG. 3c from Comparative Example 1.

Figure 4A:
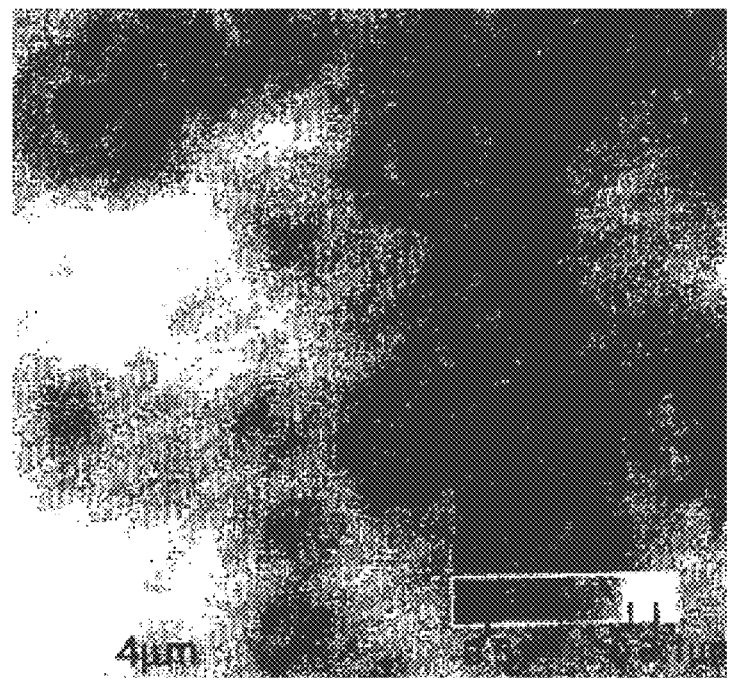
Figure 4B:
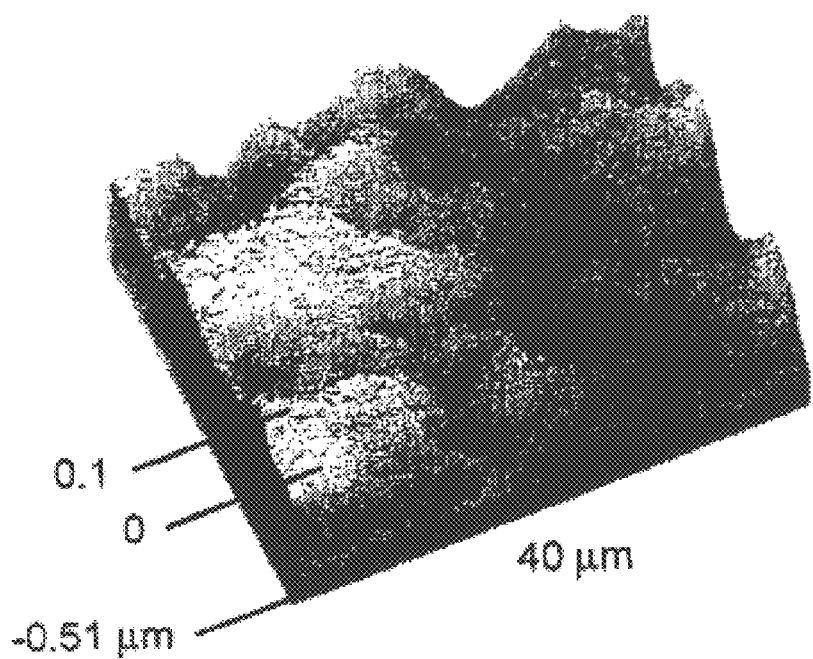
Figure 4:
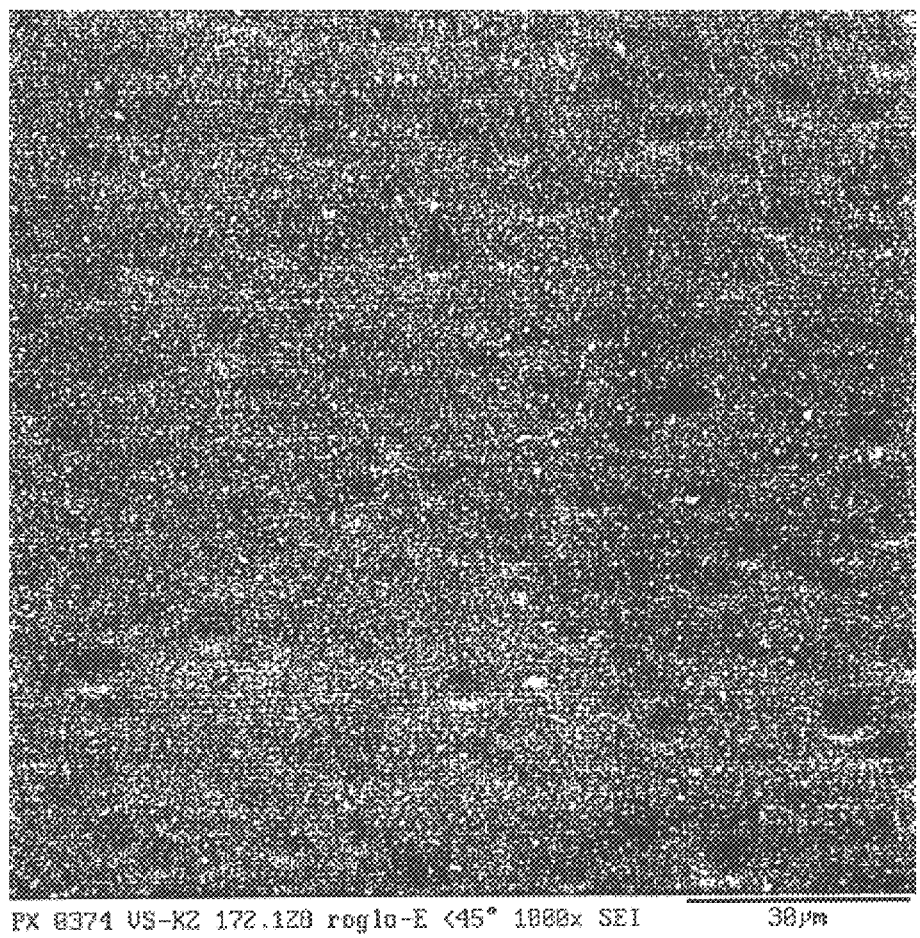

FIG. 4 with subfigures 4a and 4b shows a paper surface (corresponding to Example 1) which was produced with a chill roll having a surface structure produced by an electrolytic method. These micrographs were also made with a confocal laser microscope under the same conditions as in FIG. 3. FIG. 4b again shows a three-dimensional diagram of the paper surface. The surface of the paper here is more homogeneous than that in FIG. 3b, and the height differences based on the surface dimensions are larger and at the same time more rounded. Therefore, air can escape even at high production rates and formation of pits is thereby decreased.

FIG. 4a shows a top view of FIG. 4b and is comparable to the laser micrograph in FIG. 4c.

With the support material according to this invention, the gloss, measured at an angle of 60°, is in the range of 4% to 40%, in particular in the range of 10% to 35%. After application of a photographic emulsion or a receiving layer, the gloss measured at an angle of 60° on a black pattern is in the range of 75% to 95%, in particular 80% to 90%. The roughness Rz of the support material is in the range of 0.700 μm to 1.800 μm, in particular 0.900 μm to 1.600 μm. The standard deviation in the roughness Rz of the support material is identical to the standard deviation in the roughness Rz of the chill roll and is in the range of 0.050 μm to 0.120 μm.

All varieties of cellulose fibers and synthetic fibers are suitable for producing the base paper. Soft wood pulp and/or hardwood pulp, pulped by alkaline or acidic methods, may be used. All the sizing agents and wet strength agents known in the paper industry may be used for sizing. Inorganic compounds such as clay, kaolin, calcium carbonate and titanium dioxide are suitable pigments. The base paper may contain additional additives such as defoaming agents, optical brighteners and dyes. It can be produced on a Fourdrinier wire or a roll paper making machine. The preferred weight of the base paper is 40 to 250 g/m$^2$.

Polyolefins such as polyethylene, polypropylene and polybutene and copolymers of two or more olefins or blends thereof are suitable for extrusion. In particular suitable are all types of polyethylene such as high-density polyethylene (HDPE), low-density polyethylene (LDPE), linear low-density polyethylene (LLDPE) and blends thereof. These polyolefins may contain pigments such as titanium dioxide, clay, calcium oxide or zinc oxide. The amount of pigment is 5 to 25 wt %. The total application weight is 10 to 50 g/m$^2$.

Additional additives include auxiliary substances such as optical brighteners, coloring agents and antioxidants. Extrusion and coextrusion methods are suitable for this coating. The back side of the photographic support material may be provided with functional coatings such as an antistatic layer or a non-curling layer.

The polyolefin is extruded onto a substrate such as a paper substrate, said polyolefin being extruded in the form of a film through a gap between a pressure roll and chill roll used according to this invention. The hot polyolefin film is cooled by the chill roll, permitting the film to peel away from the roll. After coating the back side, the front side is coated in the same way.

The extrusion rate has been increased successfully from initially 275 m/min to 375 m/min. The speed can be increased further by increasing the contact pressure and by using hard pressure rolls.

The following examples are presented to further illustrate the invention.

EXAMPLE 1

A photographic base paper with a basis weight of 168 g/m$^2$ was coated on the back side with a pigment-free polyethylene blend with a low-density polyethylene (LDPE, d=0.915 g/cm$^3$) and a high-density polyethylene (HDPE, d=0.959 g/cm$^3$). The application weight was 29 g/m$^2$. The front side of the paper was coated with a mixture of a low-density polyethylene (LDPE, 0.932 g/cm$^3$) and 15 wt % titanium dioxide. The application weight amounted to 28 g/m$^2$. The coating rate was initially 275 m/min and was increased 375 m/min. The chill roll with the electrolytically designed surface had a roughness Rz of 1.624 μm, and the standard deviation in the roughness was 0.089 μm (FIG. 1).

The scanning electron micrograph in FIG. 4c shows the surface structure of the photographic support material at a coating rate of 275 m/min. The support material had a roughness Rz of 1.532 μm after the polyolefin coating, and the standard deviation of the roughness was 0.085 μm.

EXAMPLE 2

A photographic base paper with a basis weight of 220 g/m$^2$ was coated with the polyethylene blends described in Example 1. The application weight of the coating on the back side was 35 g/m$^2$. The application weight of the surface coating was 33 g/m$^2$. The chill roll with an electrolytically designed surface had a roughness Rz of 0.995 μm and a standard deviation of 0.064 μm. The coating rate was initially 275 m/min and was increased to 375 m/min. The support material had a roughness Rz of 0.875 μm after the polyolefin coating and a standard deviation of 0.062 μm.

EXAMPLE 3

An ink jet support paper with a basis weight of 140 g/m$^2$ was coated with the polyethylene blends described in Example 1. The application weight of the surface coating and the back side coating amounted 17 g/m$^2$ each. The chill roll with an electrolytically designed surface had a roughness Rz of 1.341 μm and a standard deviation of 0.098 μm. The coating rate was initially 275 m/min and was increased to 375 m/min. The support material had a roughness Rz of 1.229 μm after the polyolefin coating and a standard deviation of 0.096 μm.

EXAMPLE 4

A photographic base paper with a basis weight of 168 g/m$^2$ was coated with the polyethylene blends described in Example 1. The application weight of the coating on the back side was 29 g/m$^2$. The application weight of the surface coating was 28 g/m$^2$. The chill roll with an electrolytically designed surface had a roughness Rz of 1.605 μm and a standard deviation of 0.101 μm. The coating rate was initially 275 m/min and was increased to 375 m/min. The support material had a roughness Rz of 1.463 μm after the polyolefin coating and a standard deviation of 0.098 μm.

Comparative Example 1

The photographic base paper from Example 1 was coated with the polyethylene blends described in Example 1. The chill roll with a sandblasted surface had a roughness Rz of 1.600 μm and a standard deviation of 0.161 μm (FIG. 2). The coating rate was initially 275 m/min and was increased to 375 m/min. The scanning electron micrograph in FIG. 3c shows the surface structure of the support material according to this invention with a roughness Rz of 1.487 μm and a standard deviation of 0.159 μm after the polyolefin coating.

Comparative Example 2

The ink jet paper from Example 3 was coated with the polyethylene blends described in Example 1. The chill roll with a sandblasted surface had a roughness Rz of 1.287 μm and a standard deviation of 0.139 μm. The coating rate was initially 275 m/min and was increased to 375 m/min. The support material had a roughness Rz of 1.181 μm after the polyolefin coating and a standard deviation of 0.149 μm.

Determination of Roughness

The roughness Rz was determined with a Hommel surface scanner according to DIN 4768.

Testing the Number of Pits

Since the pits cannot be seen with the naked eye in this production step, the surface of the polyolefin-coated paper is enlarged with a microscope and scanned with a CCD camera. Using an image processing program, a profile of the pit level of 30 measurement sites is prepared. Table 3 lists the averages of the 30 measurement sites.

Gloss Measurement

The gloss was measured with a three-angle gloss meter from Dr. Bruno Lange GmbH at an angle of 60° in accordance with DIN 67,530. The support material was coated accordingly, since the quality of the glossy surface can be detected only on emulsion-coated paper or paper provided with a receiving layer.

The photographic support material from Examples 1, 2, 4 and Comparative Example 1 was coated with a normal silver chloride emulsion, exposed and developed to a black page.

In Example 3 and Comparative Example 2, the support material was coated with an ink receiving layer as described in DE 195 35 072 C2. The ink receiving layer was a printed deep black by means of a Hewlett Packard HP 550C printer.

In addition, the gloss values were also measured on the support material without any additional layer because these values are important for production control.

The test results are summarized in Tables 1 and 2.

TABLE 1

GLOSS MEASUREMENT
Photographic support material without an emulsion/receiving layer Gloss values in %

| Production rate | Ex. 1 | Ex. 2 | Ex. 3 | Ex. 4 | Com. Ex. 1 | Com Ex. 2 |
|---|---|---|---|---|---|---|
| 275 m/min | 24.5 | 30.2 | 23.9 | 10.7 | 23.0 | 22.2 |
| 300 m/min | 24.2 | 29.9 | 24.2 | 11.0 | 23.5 | 22.5 |
| 350 m/min | 25.1 | 30.6 | 23.6 | 10.5 | 23.7 | 21.8 |
| 375 m/min | 24.8 | 30.2 | 23.2 | 10.6 | 22.8 | 22.9 |

TABLE 2

GLOSS MEASUREMENT
Photographic support material with an emulsion/receiving layer Gloss values in %

| Production rate | Ex. 1 | Ex. 2 | Ex. 3 | Ex. 4 | Com. Ex. 1 | Com Ex. 2 |
|---|---|---|---|---|---|---|
| 275 m/min | 81.7 | 84.3 | 80.2 | 80.5 | 78.8 | 77.1 |
| 300 m/min | 81.4 | 84.0 | 79.8 | 80.8 | 77.8 | 76.2 |

TABLE 2-continued

GLOSS MEASUREMENT
Photographic support material with an emulsion/receiving layer Gloss values in %

| Production rate | Ex. 1 | Ex. 2 | Ex. 3 | Ex. 4 | Com Ex. 1 | Com Ex. 2 |
|---|---|---|---|---|---|---|
| 350 m/min | 82.0 | 84.9 | 81.0 | 80.3 | 77.5 | 76.5 |
| 375 m/min | 81.5 | 85.1 | 80.5 | 81.0 | 78.6 | 76.0 |

TABLE 3

PIT MEASUREMENT

Number of pits

| Production rate | Ex. 1 | Ex. 2 | Ex. 3 | Ex. 4 | Com Ex. 1 | Com Ex. 2 |
|---|---|---|---|---|---|---|
| 275 m/min | 13 | 11 | 18 | 10 | 47 | 55 |
| 300 m/min | 27 | 25 | 30 | 19 | 53 | 64 |
| 350 m/min | 36 | 33 | 41 | 28 | 61 | 79 |
| 375 m/min | 45 | 44 | 52 | 37 | 87 | 95 |

The results from Table 1 through 3 show that a support material with a high gloss and a low pit level can be produced at significantly higher production rates by using a chill roll with an electrolytically designed surface structure.

What is claimed is:

1. A polyolefin-coated support material whose surface is shaped with a chill roll, said support material having an electrolytically structured surface with a standard deviation of the roughness Rz of 0.050 μm to 0.120 μm.

2. A polyolefin-coated support material according to claim 1, wherein the roughness Rz of the surface of the support material is 0.700 to 1.800 μm.

3. A polyolefin-coated support material according to claim 2, wherein the roughness Rz of the surface of the support material is 0.900 to 1.600 μm.

4. A polyolefin-coated support material according to claim 1, wherein the gloss of the surface of the support material at a measurement angle of 60° is 4% to 40%.

5. A polyolefin-coated support material according to claim 4, wherein the gloss of the surface of the support material at a measurement angle of 60° is 10% to 35%.

6. A polyolefin-coated support material according to claim 1, wherein the support material is a support material for photographic and non-photographic imaging processes.

* * * * *

UNITED STATES PATENT AND TRADEMARK OFFICE
CERTIFICATE OF CORRECTION

PATENT NO. : 6,399,180 B1
DATED : June 4, 2002
INVENTOR(S) : Gunter Raabe

It is certified that error appears in the above-identified patent and that said Letters Patent is hereby corrected as shown below:

Drawings,
After FIG. 3B insert the sheet of attached drawing containing FIG. 3c.

Column 5,
Table 1, line 35, change "Com Ex. 2" to -- Com. Ex. 2 --.
Table 2, line 48, change "Com Ex. 1" to -- Com. Ex. 1 --.
Table 2, line 48, change "Com Ex. 2" to -- Com. Ex. 2 --.

Column 6,
Table 2-continued, line 8, change "Com Ex. 1" to -- Com. Ex. 1 --.
Table 2-continued, line 8, change "Com Ex. 2" to -- Com. Ex. 2 --.
Table 3, line 19, change "Com Ex. 1" to -- Com. Ex. 1 --.
Table 3, line 19, change "Com Ex. 2" to -- Com. Ex. 2 --.

Signed and Sealed this

First Day of April, 2003

JAMES E. ROGAN
*Director of the United States Patent and Trademark Office*

SCANNING ELECTRON MICROGRAPHS (Lighting angle 45°)